Aug. 11, 1936.  C. A. DE GIERS  2,050,965
REMOTE INDICATING THERMOMETER
Filed Jan. 26, 1935  2 Sheets—Sheet 1
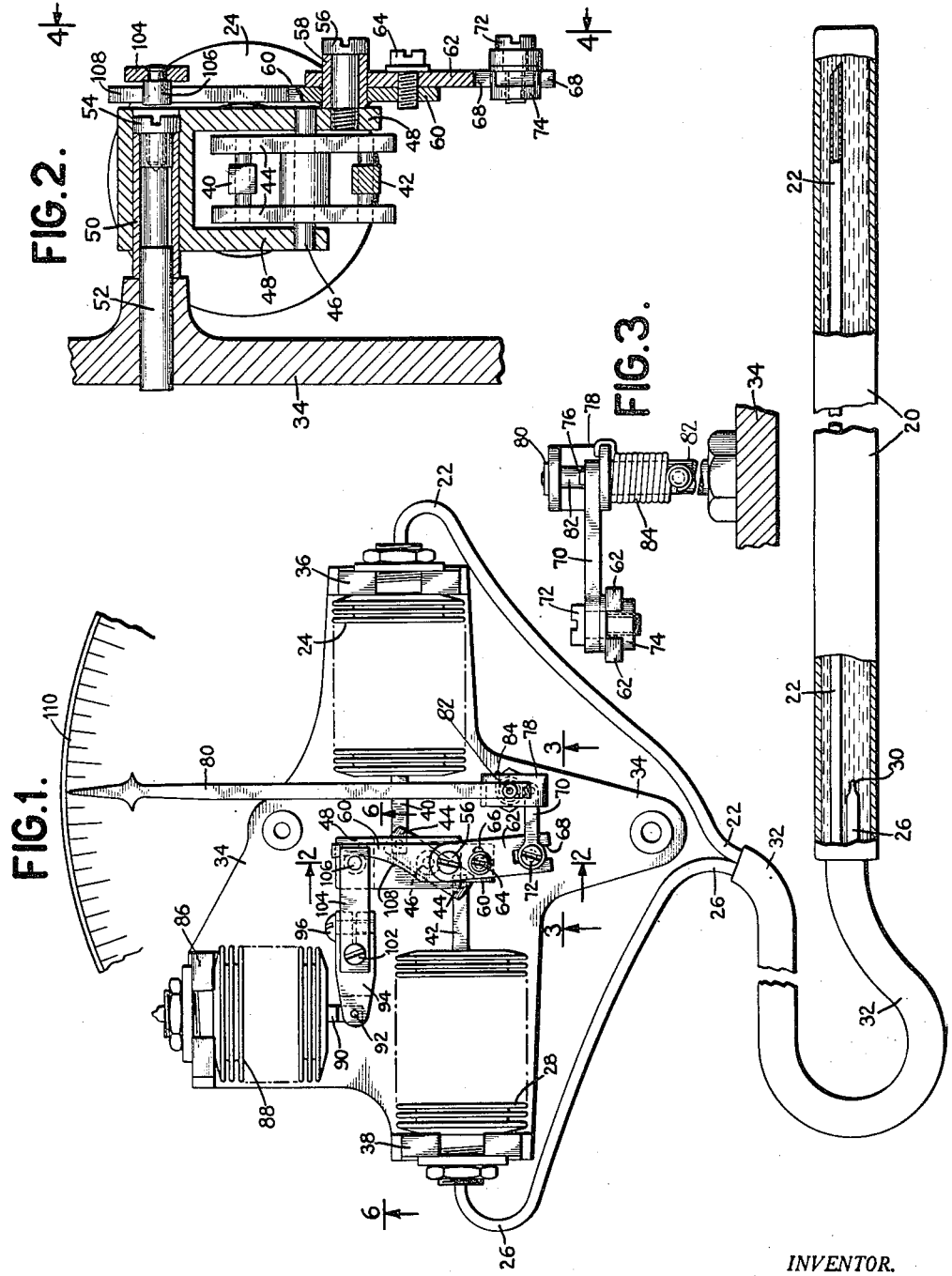
INVENTOR.
CLARENCE A. de GIERS
BY
Cooper, Kerr & Dunham
ATTORNEYS.

Aug. 11, 1936.  C. A. DE GIERS  2,050,965
REMOTE INDICATING THERMOMETER
Filed Jan. 26, 1935  2 Sheets-Sheet 2
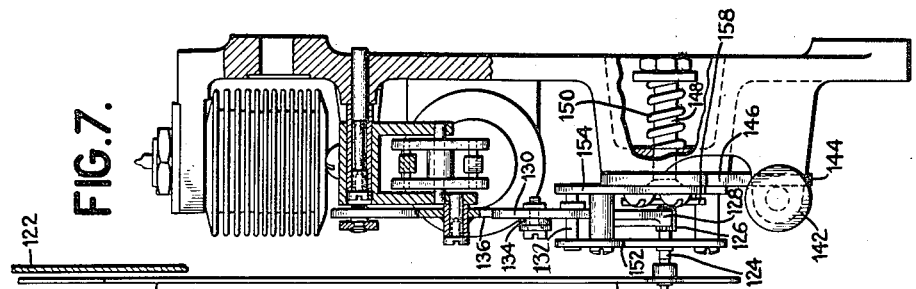
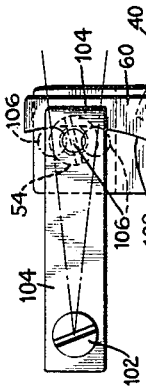
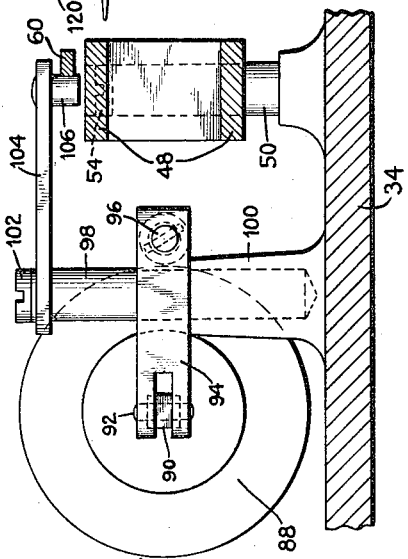
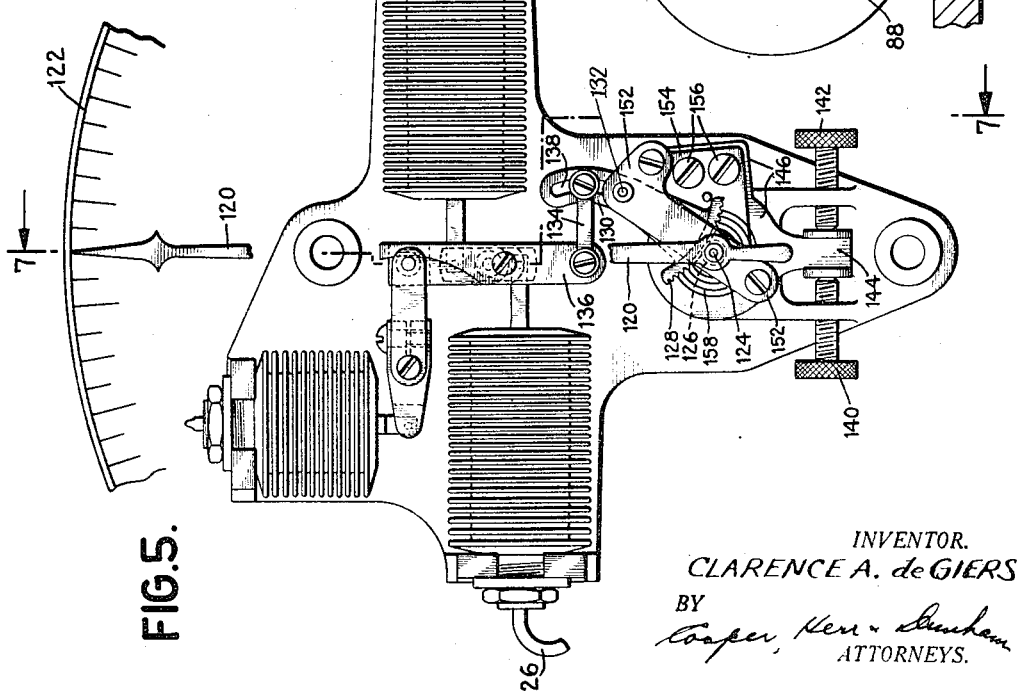
INVENTOR.
CLARENCE A. de GIERS
BY
Cooper, Kerr & Dunham
ATTORNEYS.

Patented Aug. 11, 1936

2,050,965

UNITED STATES PATENT OFFICE 2,050,965

REMOTE INDICATING THERMOMETER

Clarence A. de Giers, Forest Hills, N. Y.

Application January 26, 1935, Serial No. 3,563

7 Claims. (Cl. 73—52)

This invention covers an improvement in the type of remote indicating thermometer disclosed in my Patent No. 1,943,267 issued January 9, 1934. The instrument described in that patent is sufficiently accurate for ordinary use, but when the variations of temperature and the range of indicated temperature are out of the ordinary, the device may, to advantage, be refined as herein disclosed in order to provide the utmost accuracy under all conditions of service.

In the patent, the indicator is actuated by a floating link which is under control of two bellows, and the link serves to compensate for changes of temperature. However, the compensation is not quite complete. One bellows is connected to a tube having an end open to the liquid in the thermometer bulb. The second bellows is connected to a tube having an end closed at the bulb. As the temperature of the bulb changes, more or less liquid is forced therefrom through the open end tube into the first bellows, which therefore varies in length relatively to the second bellows since the quantity of liquid in the second bellows and its tube remains constant. The first bellows may become enough longer or shorter than the second bellows so that the longitudinal expansion or contraction of the two bellows under the atmospheric temperature to which they may be exposed is sufficient to cause an error greater than the allowable tolerance.

An object of the invention is to provide means for automatically compensating for the differences of length of the two bellows in order to give correct temperature indications even under extremes of temperature, such as may be encountered, for instance, in refrigerator cars where the bulb is inside the car and may vary from atmospheric temperature to many degrees below zero while the indicator is outside the car and may be exposed to temperatures which may vary from many degrees below zero, to the direct rays of the summer sun. It has been found that the invention serves also to provide correct indications when the instrument is subjected to changes of altitude, as in an airplane.

Further and other objects and advantages will be apparent from the specification and claims, and from the accompanying drawings which illustrate what is now considered the preferred embodiment of the invention.

Fig. 1 is a general view, somewhat diagrammatic, of one form of the device.

Fig. 2 is an enlarged view on line 2—2 of Fig. 1.

Fig. 3 is an enlarged view on line 3—3 of Fig. 1.

Fig. 4 is a view on line 4—4 of Fig. 2 showing on an enlarged scale some details of Fig. 1.

Fig. 5 is a view of a modified form of the indicator of Fig. 1.

Fig. 6 is an enlarged view on line 6—6 of Fig. 1.

Fig. 7 is a view on line 7—7 of Fig. 5.

In the drawings the thermometer bulb is designated 20. An open-end tube 22 extends from the inner end of the bulb to the fixed end of bellows 24. A tube 26 extends from the fixed end of bellows 28 to terminate with a sealed end 30 at the outer end of bulb 20. Tubes 22 and 26 may be enclosed in a protecting conduit 32. The bellows, tubes and bulb are filled with liquid, and the bellows are mounted on parallel offset axes and with their outer ends fixed to brackets 36 and 38 on frame 34, but with their inner ends pivotally connected through rods 40, 42 to opposite ends of link 44. Link 44 is pivotally mounted at 46 in a yoke 48 which, in turn, is pivotally supported on a sleeve 50, Fig. 2, the sleeve closely surrounding a pin 52 set into frame 34, the sleeve being held on the pin by screw 54.

In operation yoke 48 corresponds to the pointer in my above mentioned patent, and if the yoke were extended in the form of a pointer the above described apparatus would give the same results as the apparatus of the patent, link 44 swinging idly about its pivot 46 when the temperature of the indicating apparatus changes, and yoke 48 swinging about its fulcrum pin 52 when the temperature of the bulb changes.

If the bulb be subjected to an extreme change of temperature, bellows 24 may become enough longer or shorter than bellows 28 so that the longitudinal expansion or contraction of the two bellows, under the atmospheric temperature to which they are exposed, might be sufficient, if yoke 48 were to serve as an indicator, to cause an error greater than the allowable tolerance. For such conditions the improvements now to be described are provided.

Projecting from the lower end of one of the arms of 48 is a stud 56. Surrounding stud 56 is a rotatable sleeve 58 to which is attached a vertical arm 60. Pivotally mounted on sleeve 58 is a downwardly extending arm 62 which is adjustably attached to the lower end of arm 60 by a screw tapped into arm 60 and passing through a slot 66 in arm 62. The lower end of arm 62 has a vertical slot 68 in which a horizontal link 70 is adjustably connected by screw 72 and block 74, Fig. 3. The other end of link 70 is connected at 76 to yoke 78 to which the lower end of pointer 80 is attached. Yoke 78 and the pointer are fulcrumed on stud 82 set into frame 34, and a spring 84 surrounding the stud serves to prevent backlash in the train of indicating mechanism.

Attached at its upper end to flange 86 of frame 34 is a sealed liquid-filled bellows 88. The axis of the bellows is vertical and a stem 90 extending downwardly from its lower end is pivotally attached at 92 to the end of a horizontal arm 94 (Figs. 1 and 6), split at its other end and clamped by screw 96 to stud 98 pivotally mounted in boss 100 of frame 34. Secured by screw 102 to the outer end of stud 98 is a horizontal arm 104. The free end of arm 104 has a fulcrum stud 106 which is in substantial alignment with pin 52 and in contact with the arcuate surface 108 formed in arm 60.

If fulcrum 106 is axially aligned with pin 52 as shown in Figs. 1 and 2, then arm 60 and its extension 62 will swing about the same center as yoke 48, but if stud 106 is out of alignment with pin 52, as indicated by the upper and lower positions of Fig. 4, then arms 60, 62 will swing about a different center than yoke 48, thus changing the multiplication of the lever system and modifying the travel of pointer 80 across chart 110 as compared with what the travel would be if the pointer were simply an extension of yoke 48, as it is, in effect, in my prior patent.

As explained above, bellows 24 and 28 vary slightly in length with reference to each other when the change of bulb temperature forces liquid into, or draws liquid from, bellows 24. Both bellows expand or contract lengthwise regardless of bulb temperature whenever the temperature of the surrounding atmosphere varies. Bellows 24, due to bulb temperature, may be longer or shorter than bellows 28, therefore when both bellows are subjected to the same change of atmospheric temperature, the length of bellows 24 will vary more or less than the length of bellows 28 by a differential amount dependent on the differences in lengths of the two bellows, and that differential variation would move the pointer and give a false indication were it not for bellows 88. Bellows 88 is always subjected to the same changes of atmospheric temperature as bellows 24 and 28 and, of course, varies in length according to the atmospheric temperature to which it and the other bellows are exposed. As explained above, such variations of length of bellows 88 move fulcrum pin 106 through the instrumentality of arms 94 and 104, and control the pointer to prevent the slightly false indications that would otherwise exist due to the above mentioned differential variations. The split end of arm 94 permits adjustment of the zero position of stud 106 relatively to arm 94. In like manner arm 62 may be adjusted relatively to arm 60 by slot 66 and screw 64, Figs. 1 and 4, to provide a zero adjustment for pointer 80. Also, the travel of pointer 80 may be adjusted by changing the effective length of arms 60—62 by moving block 74 and screw 72 in slot 68 (Figs. 1, 3 and 4).

The modification above described has a pointer of rather limited travel, and therefore gives its indications on a fan-shaped chart. When a greater pointer travel is desired, the modification of Figs. 5 and 7 may be used to move pointer 120 around a chart 122 of 360°. Pointer 120 is mounted on shaft 124 which carries pinion 126 engaged by arcuate rack 128 on arm 130 pivoted at 132. Arm 130 is actuated by link 134 connected to the lower end of arm 136 which corresponds to the arm 60—62 of the modification previously described. Adjustment for travel of pointer 120 is provided by slot 138 in the upper end of arm 130, while the zero adjustment is provided by thumb screws 140, 142, acting on the downward extension 144 of plate 146 rotatably supported by shaft 148 in axial alignment with pinion shaft 124. Compression spring 150 surrounding shaft 148 serves to hold plate 146 snugly against the frame of the device. Rack 128 and pinion 126 are supported by and between the two parallel plates 152 and 154, the latter of which is secured by screws 156 to rotary plate 146. Thus when screws 140, 142 are adjusted, the whole rack and pinion assembly is rotated about the axis of the pinion shaft, and since the upper end of sector arm 130 is held by link 134, sector 128 rotates the pinion shaft and changes the position of the pointer with reference to its chart 122. The usual spring 158 is provided to take up backlash.

It is to be understood that the invention is not limited to the specific embodiment herein illustrated and described, but may be used in other ways without departure from its spirit as defined by the following claims.

I claim:

1. Apparatus for indicating temperature at a remote point, comprising in combination, a bulb adapted for exposure to a change of temperature, an indicator remote from said bulb, a bellows connected by a tube to the interior of said bulb, a lever system operatively connecting said bellows to said indicator, said lever system including a floating link, said bellows being operatively connected to one end of said link, a second bellows operatively connected to the other end of said link, and a third bellows operatively connected to another point of said lever system, said second and third bellows being effective for modifying the operation of said indicator in the manner set forth.

2. Apparatus for indicating temperature at a remote point, comprising in combination, a bulb adapted for exposure to a change of temperature, an indicator remote from said bulb, a bellows connected by a tube to the interior of said bulb, a lever system operatively connecting said bellows to said indicator, and a bellows controlling the location of a fulcrum in said lever system whereby the multiplication of a lever of said system is changed and the operation of said indicator thereby modified, for the purpose set forth.

3. Apparatus for indicating temperature at a remote point, comprising in combination, a bulb adapted for exposure to a change of temperature, an indicator remote from said bulb, a bellows connected by a tube to the interior of said bulb, a lever system operatively connecting said bellows to said indicator, and temperature controlled means for modifying the action of said lever system by changing the multiplication of a lever of said system, for the purpose set forth.

4. Apparatus for indicating temperature at a remote point, comprising in combination, a bulb adapted for exposure to a change of temperature, an indicator remote from said bulb, a bellows connected by a tube to the interior of said bulb, a lever system operatively connecting said bellows to said indicator, said lever system including a swinging yoke, a floating link pivoted on said yoke, said bellows being operatively connected to one end of said link, a second bellows operatively connected to the other end of said link, a lever pivotally supported on said yoke, means connecting one end of said lever to said indicator, and temperature controlled means operable elsewhere on said lever for modifying the movement of said indicator substantially as described.

5. Apparatus for indicating temperature at a remote point, comprising in combination, a bulb adapted for exposure to a change of temperature, an indicator remote from said bulb, a bellows connected by a tube to the interior of said bulb, a lever system operatively connecting said bellows to said indicator, said lever system including a swinging yoke, a floating link pivoted on said yoke, said bellows being operatively connected to one end of said link, a second bellows operatively connected to the other end of said link, a lever pivotally supported on said yoke, a movable fulcrum for said lever, means connecting said lever to said indicator, and temperature controlled means for moving said fulcrum whereby the movement of said indicator is modified, substantially as described.

6. Apparatus for indicating temperature at a remote point, comprising in combination, a bulb adapted to be exposed to change of temperature, an indicator remote from said bulb, a pair of bellows operatively connected to said indicator, one of said bellows being connected by a tube to the interior of said bulb, the other having a similar tube leading to said bulb but closed at its end adjacent the bulb, said first bellows being effective to move said indicator in response to change of temperature of said bulb, and said second bellows being effective to compensate for change of temperature of parts of the apparatus between said bulb and said indicator, and a third bellows independent of said bulb but responsive to temperature changes for modifying the action of said pair of bellows on said indicator, for the purpose set forth.

7. Apparatus for indicating temperature at a remote point, comprising in combination, a bulb adapted to be exposed to change of temperature, an indicator remote from said bulb, a pair of bellows operatively connected to said indicator, one of said bellows being connected by a tube to the interior of said bulb, the other having a similar tube leading to said bulb but closed at its end adjacent the bulb, said first bellows being effective to move said indicator in response to change of temperature of said bulb, and said second bellows being effective to compensate for change of temperature of parts of the apparatus between said bulb and said indicator, and a third bellows independent of said bulb but responsive to temperature changes for modifying the action of said indicator to avoid error due to the relative variations in lengths of said first and second bellows which are caused by said first bellows being connected to the interior of the said bulb while said second bellows is closed therefrom.

CLARENCE A. DE GIERS.